United States Patent
Moulinie

(10) Patent No.: US 8,013,066 B2
(45) Date of Patent: Sep. 6, 2011

(54) PROCESS FOR THE PRODUCTION OF IMPACT-MODIFIED POLYALKYLENE TEREPHTHALATE/POLYCARBONATE COMPOSTIONS

(75) Inventor: Pierre Moulinie, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 930 days.

(21) Appl. No.: 11/818,389

(22) Filed: Jun. 14, 2007

(65) Prior Publication Data

US 2008/0214723 A1 Sep. 4, 2008

(30) Foreign Application Priority Data

Jun. 20, 2006 (DE) .................. 10 2006 028 233

(51) Int. Cl.
*C08L 69/00* (2006.01)
*C08L 67/02* (2006.01)
(52) U.S. Cl. ...................... 525/133; 525/148
(58) Field of Classification Search .............. None
See application file for complete search history.

(56) References Cited

U.S. PATENT DOCUMENTS

| 5,369,154 A | 11/1994 | Laughner | 523/436 |
| 5,814,712 A | 9/1998 | Gallucci et al. | 525/436 |
| 6,476,158 B1 | 11/2002 | England et al. | |

FOREIGN PATENT DOCUMENTS

| EP | 0 803 537 A2 | 3/2003 |
| JP | 06-298991 A | 10/1994 |
| WO | 98/23684 A | 6/1998 |

*Primary Examiner* — David Buttner
(74) *Attorney, Agent, or Firm* — Baker Donelson Bearman, Caldwell & Berkowitz, PC

(57) ABSTRACT

A process for the production of impact-modified composition that contains polyalkylene terephthalate and polycarbonate resins is disclosed. The process includes (i) in a first step combining in the melt at 90 to 175° C. glycidyl ester with at least one member selected from the first group consisting of polyalkylene terephthalate and polycarbonate to obtain a molten mixture, said member in powder form, and (ii) in a subsequent step combining the molten mixture with at least one component selected from the second group consisting of polyalkylene terephthalate and polycarbonate to obtain a composition. The composition is characterized in high gloss value.

12 Claims, No Drawings

PROCESS FOR THE PRODUCTION OF IMPACT-MODIFIED POLYALKYLENE TEREPHTHALATE/POLYCARBONATE COMPOSTIONS

FIELD OF THE INVENTION

The invention relates to a process for the production of thermoplastic molding compositions and in particular to impact-modified compositions containing polyalkylene terephthalate and polycarbonate.

TECHNICAL BACKGROUND OF THE INVENTION

Impact-modified molding compositions containing a polyester resin, a polycarbonate resin and a glycidyl ester as impact modifier and their use as molding compositions, for example in the automotive sector for moldings such as, for example, mirror casings and bonnet ventilation grills, in which a glossy, fault-free surface appearance is required, are known (see, for example, U.S. Pat. No. 5,369,154).

EP-A 0 803 537 discloses a process for the production of impact-modified polyester/polycarbonate molding compositions, according to which in a first step a mixture of glycidyl ester copolymer and polycarbonate resin in the melt is prepared and then, in a second step, the mixture of glycidyl ester copolymer and polycarbonate resin is combined with a polyester resin and a second portion of the polycarbonate resin.

The object of this invention was, therefore, to develop an improved process for the production of polyalkylene terephthalate/polycarbonate compositions impact-modified with glycidyl ester copolymer that are distinguished by improved gloss and whereby at the same time a good notched impact strength is maintained.

SUMMARY OF THE INVENTION

A process for the production of impact-modified composition that contains polyalkylene terephthalate and polycarbonate resins is disclosed. The process includes (i) in a first step combining in the melt at 90 to 175° C. glycidyl ester with at least one member selected from the first group consisting of polyalkylene terephthalate and polycarbonate to obtain a molten mixture, said member in powder form, and (ii) in a subsequent step combining the molten mixture with at least one component selected from the second group consisting of polyalkylene terephthalate and polycarbonate to obtain a composition. The composition is characterized in high gloss value.

DETAILED DESCRIPTION OF THE INVENTION

Surprisingly, it has now been found that a process comprising a first step in which the polyalkylene terephthalate and/or polycarbonate is incorporated in powder form into a melt of the impact modifier, and a second step in which the filled impact modifier from the first step is mixed with further polyalkylene terephthalate and/or polycarbonate, preferably in the melt, yields compositions that are distinguished by improved gloss and whereby at the same time a good notched impact strength is maintained.

The invention provides a process for the production of impact-modified polyalkylene terephthalate/polycarbonate compositions, comprising
(i) combining a melt of an impact modifier of glycidyl ester with at least one component selected from the group consisting of polyalkylene terephthalate in the form of a powder and polycarbonate in the form of a powder,
(ii) combining the mixture from (i) with at least one component selected from the group consisting of polyalkylene terephthalate and polycarbonate and optionally further components in the melt,
wherein the melt in step (i) has a temperature of from 90 to 175° C., preferably from 100 to 150° C. In a preferred embodiment the composition contains
A) from 4 to 95 parts by weight, preferably from 10 to 60 parts by weight, particularly preferably from 12 to 40 parts by weight, especially from 15 to 30 parts by weight, of polyalkylene terephthalate, preferably polybutylene terephthalate,
B) from 4 to 95 parts by weight, preferably from 20 to 80 parts by weight, particularly preferably from 25 to 60 parts by weight, especially from 35 to 55 parts by weight, of aromatic polycarbonate,
C) from 1 to 30 parts by weight, preferably from 3 to 25 parts by weight, particularly preferably from 6 to 20 parts by weight, especially from 8 to 16 parts by weight, of impact modifier of glycidyl ester and
D) from 0 to 20 parts by weight, preferably from 0.15 to 15 parts by weight, particularly preferably from 0.2 to 10 parts by weight, of conventional additives and processing aids, the sum of the parts by weight of components A+B+C+D being normalized to 100.

Step (ii) is carried out according to known processes by melt-mixing of the components. It may be advantageous to pre-mix individual components. Mixing in the melt the mixture from step (i) with components A) to D) and optionally with further constituents preferably takes place at temperatures of from 220 to 300° C. by kneading, extruding or rolling the components together.

The mean particle size ($d_{50}$), determined by means of light scattering (Puckhaber, M.; Roethele, S. Powder Handling & Processing (1999), 11(1), 91-95)), is the diameter above and below which in each case 50 wt. % of the particles lie.

The mean particle size $d_{50}$ of the pulverulent polyalkylene terephthalate and of the pulverulent polycarbonate used in step (i) is preferably from 600 to 700 μm, particularly preferably from 630 to 640 μm.

A preferred embodiment of the invention is a process for the production of impact-modified polyalkylene terephthalate/polycarbonate compositions, comprising
(i) combining a melt (at a temperature of from 90 to 175° C., preferably from 100 to 150° C.) of an impact modifier of glycidyl ester with polyalkylene terephthalate according to component A in the form of a powder having a mean particle size $d_{50}$ of from 600 to 700 μm and
(ii) combining the mixture from (i) with at least one component selected from the group consisting of polyalkylene terephthalate (component A) and polycarbonate (component B) and optionally further components, characterised in that this process step is carried out at temperatures of from 220 to 300° C. in the melt by kneading, extruding or rolling the components together,
wherein the composition contains
A) from 4 to 95 parts by weight, preferably from 10 to 60 parts by weight, particularly preferably from 12 to 40 parts by weight, especially from 15 to 30 parts by weight, of polyalkylene terephthalate, preferably polybutylene terephthalate,
B) from 4 to 95 parts by weight, preferably from 20 to 80 parts by weight, particularly preferably from 25 to 60 parts by weight, especially from 35 to 55 parts by weight, of aromatic polycarbonate, C) from 1 to 30 parts by weight, preferably from 3 to 25 parts by weight, particularly preferably from 6 to 20 parts by weight, especially from 8 to 16 parts by weight, of impact modifier of glycidyl ester and D) from 0 to 20 parts by weight, preferably from 0.15 to 15 parts by weight, particularly preferably from 0.2 to 10 parts by weight, of conventional additives and processing aids.

Component A

According to the invention, the compositions contain as component A) one polyalkylene terephthalate or a mixture of two or more different polyalkylene terephthalates. Polyalkylene terephthalates within the scope of the invention are polyalkylene terephthalates which are derived from terephthalic acid (or reactive derivatives thereof) and alkanediols, for example based on propylene glycol or butanediol. According to the invention there is preferably used as component A) polybutylene terephthalate and/or polytrimethylene terephthalate, most preferably polybutylene terephthalate.

Polyalkylene terephthalates within the scope of the invention are reaction products of aromatic dicarboxylic acids or reactive derivatives thereof (e.g. dimethyl esters or anhydrides) and aliphatic, cycloaliphatic or araliphatic diols, and mixtures of these reaction products.

Preferred polyalkylene terephthalates may be prepared from terephthalic acid (or reactive derivatives thereof) and aliphatic or cycloaliphatic diols having from 2 to 10 carbon atoms by known methods (Kunststoff-Handbuch, Vol. VIII, p. 695 ff, Karl-Hanser-Verlag, Munich 1973).

Preferred polyalkylene terephthalates contain at least 80 mol %, preferably 90 mol %, based on the dicarboxylic acid, of terephthalic acid radicals and at least 80 mol %, preferably at least 90 mol %, based on the diol component, of ethylene glycol and/or 1,3-propanediol and/or 1,4-butanediol radicals.

The preferred polyalkylene terephthalates may contain, in addition to terephthalic acid radicals, up to 20 mol % of radicals of other aromatic dicarboxylic acids having from 8 to 14 carbon atoms or of aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, cyclohexanedicarboxylic acid.

The preferred polyalkylene terephthalates may contain, in addition to ethylene or 1,3-propanediol or 1,4-butanediol glycol radicals, up to 20 mol % of other aliphatic diols having from 3 to 12 carbon atoms or of cycloaliphatic diols having from 6 to 21 carbon atoms, for example radicals of 1,3-propanediol, 2-ethyl-1,3-propane-diol, neopentyl glycol, 1,5-pentanediol, 1,6-hexanediol, 1,4-cyclohexane-dimethanol, 3-methyl-2,4-pentanediol, 2-methyl-2,4-pentanediol, 2,2,4-trimethyl-1,3-pentanediol and -1,6,2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-A 24 07 674, 24 07 776, 27 15 932).

The polyalkylene terephthalates may be branched by the incorporation of relatively small amounts of tri- or tetrahydric alcohols or of tri- or tetra-basic carboxylic acids, as are described, for example, in DE-A 19 00 270 and U.S. Pat. No. 3,692,744. Examples of preferred branching agents are trimesic acid, trimellitic acid, trimethylol-ethane and propane and pentaerythritol.

It is advisable to use not more than 1 mol % of the branching agent, based on the acid component.

Particular preference is given to polyalkylene terephthalates that have been prepared solely from terephthalic acid and reactive derivatives thereof (e.g. dialkyl esters thereof) and ethylene glycol and/or 1,3-propanediol and/or 1,4-butanediol (polyethylene and polybutylene terephthalate), and mixtures of these polyalkylene terephthalates.

Preferred polyalkylene terephthalates are also copolyesters which are prepared from at least two of the above-mentioned acid components and/or from at least two of the above-mentioned alcohol components, and particularly preferred copolyesters are poly-(ethylene glycol/1,4-butanediol) terephthalates.

The polyalkylene terephthalates generally have an intrinsic viscosity of approximately from 0.4 to 1.5 dl/g, preferably from 0.5 to 1.3 dl/g, in each case measured in phenol/o-dichlorobenzene (1:1 parts by weight) at 25° C.

Preferably, the polyesters prepared according to the invention may also be used in admixture with other polyesters and/or further polymers. Particular preference is given to the use of mixtures of polyalkylene terephthalates with other polyesters.

Conventional additives, such as, for example, mold-release agents, stabilizers and/or flow agents, may be mixed with the polyesters in the melt or applied to the surface thereof.

Component B

According to the invention, the compositions according to the invention contain as component B) a polycarbonate or a mixture of polycarbonates.

Preferred polycarbonates are homopolycarbonates and copolycarbonates based on aromatic dihydroxy compounds (herein bisphenols) of the general formula (I)

HO—Z—OH (I)

wherein Z is a divalent organic radical having from 6 to 30 carbon atoms which contains one or more aromatic groups.

Preference is given to bisphenols of formula (Ia)

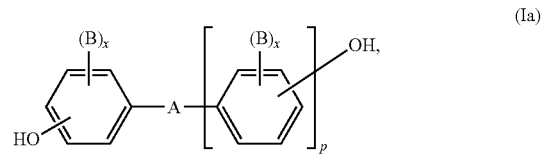

wherein

A represents a single bond, $C_1$-$C_5$-alkylene, $C_2$-$C_5$-alkylidene, $C_5$-$C_6$-cycloalkylidene, —O—, —SO—, —CO—, —S—, —SO$_2$—, $C_6$-$C_{12}$-arylene, to which there may be fused further aromatic rings optionally containing hetero atoms, or a radical of formula (II) or (III)

-continued

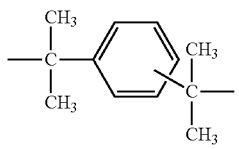
(III)

each of the substituents B represents $C_1$-$C_{12}$-alkyl, preferably methyl, halogen, preferably chlorine and/or bromine, the substituents x are each independently of the other 0, 1 or 2, p represents 1 or 0, and $R^1$ and $R^2$ may be selected individually for each $X^1$ and are each independently of the other hydrogen or $C_1$-$C_6$-alkyl, preferably hydrogen, methyl or ethyl, $X^1$ represents carbon, and m represents an integer from 4 to 7, preferably 4 or 5, with the proviso that on at least one atom $X^1$, $R^1$ and $R^2$ are simultaneously alkyl.

Examples of bisphenols according to the general formula (I) are bisphenols belonging to the following groups: dihydroxydiphenyls, bis-(hydroxyphenyl)-alkanes, bis-(hydroxyphenyl)-cycloalkanes, indane bisphenols, bis-(hydroxyphenyl) sulfides, bis-(hydroxyphenyl) ethers, bis-(hydroxyphenyl) ketones, bis-(hydroxyphenyl)sulfones, bis-(hydroxyphenyl) sulfoxides and α,α'-bis-(hydroxyphenyl)-diisopropylbenzenes.

Examples of bisphenols according to the general formula (I) are also derivatives of the mentioned bisphenols which are obtainable, for example, by alkylation or halogenation on the aromatic rings of the mentioned bisphenols.

Examples of bisphenols according to the general formula (I) are in particular the following compounds: hydroquinone, resorcinol, 4,4'-dihydroxydiphenyl, bis-(4-hydroxyphenyl) sulfide, bis-(4-hydroxyphenyl)sulfone, bis-(3,5-dimethyl-4-hydroxyphenyl)-methane, bis-(3,5-dimethyl-4-hydroxyphenyl)-sulfone, 1,1-bis-(3,5-dimethyl-4-hydroxyphenyl)-p/m-diisopropylbenzene, 1,1-bis-(4-hydroxyphenyl)-1-phenyl-ethane, 1,1-bis-(3,5-dimethyl-4-hydroxyphenyl)-cyclohexane, 1,1-bis-(4-hydroxyphenyl)-3-methylcyclohexane, 1,1-bis-(4-hydroxyphenyl)-3,3-dimethylcyclohexane, 1,1-bis-(4-hydroxyphenyl)-4-methylcyclohexane, 1,1-bis-(4-hydroxyphenyl)-cyclohexane, 1,1-bis-(4-hydroxyphenyl)-3,3,5-trimethylcyclohexane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-propane (i.e. bisphenol A), 2,2-bis-(3-chloro-4-hydroxyphenyl)-propane, 2,2-bis-(3,5-dibromo-4-hydroxyphenyl)-propane, 2,4-bis-(4-hydroxyphenyl)-2-methylbutane, 2,4-bis-(3,5-dimethyl-4-hydroxyphenyl)-2-methylbutane, α,α'-bis-(4-hydroxyphenyl)-o-diisopropylbenzene, α,α'-bis-(4-hydroxyphenyl)-m-diisopropylbenzene (i.e. bisphenol M), α,α'-bis-(4-hydroxyphenyl)-p-diisopropylbenzene and indane bisphenol.

Particularly preferred polycarbonates are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

The described bisphenols according to the general formula (I) may be prepared by known processes, for example from the corresponding phenols and ketones.

Suitable bisphenols and processes for their preparation are described, for example, in the monograph H. Schnell, "Chemistry and Physics of Polycarbonates", Polymer Reviews, Volume 9, p. 77-98, Interscience Publishers, New York, London, Sidney, 1964 and in U.S. Pat. No. 3,028,635, in U.S. Pat. No. 3,062,781, in U.S. Pat. No. 2,999,835, in U.S. Pat. No. 3,148,172, in U.S. Pat. No. 2,991,273, in U.S. Pat. No. 3,271,367, in U.S. Pat. No. 4,982,014, in U.S. Pat. No. 2,999,846, in DE-A 1 570 703, in DE-A 2 063 050, in DE-A 2 036 052, in DE-A 2 211 956, in DE-A 3 832 396, and in FR-A 1 561 518 and also in the Japanese Offenlegungsschriften having the application numbers JP-A 62039 1986, JP-A 62040 1986 and JP-A 105550 1986.

1,1-Bis-(4-hydroxyphenyl)-3,3,5-trimethylcyclohexane and its preparation are described, for example, in U.S. Pat. No. 4,982,014.

Indane bisphenols and their preparation are described, for example, in U.S. Pat. No. 3,288,864, in JP-A 60 035 150 and in U.S. Pat. No. 4,334,106. Indane bisphenols may be prepared, for example, from isopropenylphenol or its derivatives or from dimers of isopropenylphenol or its derivatives in the presence of a Friedel-Crafts catalyst in organic solvents.

Polycarbonates may be prepared by known processes. Suitable processes for the preparation of polycarbonates are, for example, preparation from bisphenols with phosgene by the interfacial process or from bisphenols with phosgene by the process in homogeneous phase, the so-called pyridine process, or from bisphenols with carbonic acid esters by the melt transesterification process. These preparation processes are described, for example, in H. Schnell, "Chemistry and Physics of Polycarbonates", Polymer Reviews, Volume 9, p. 31-76, Interscience Publishers, New York, London, Sidney, 1964. The mentioned preparation processes are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K. Kircher and P. R. Müller "Polycarbonate" in Becker, Braun, Kunststoff-Handbuch, Volume 3/1, Polycarbonate, Polyacetale, Polyester, Celluloseester, Carl Hanser Verlag Munich, Vienna 1992, pages 117 to 299 and in D. C. Prevorsek, B. T. Debona and Y. Kesten, Corporate Research Center, Allied Chemical Corporation, Morristown, N.J. 07960, "Synthesis of Poly(estercarbonate) Copolymers" in Journal of Polymer Science, Polymer Chemistry Edition, Vol. 19, 75-90 (1980).

The melt transesterification process is described in particular, for example, in H. Schnell, "Chemistry and Physics of Polycarbonates", Polymer Reviews, Volume 9, p. 44 to 51, Interscience Publishers, New York, London, Sidney, 1964 and in DE-A 1 031 512.

In the preparation of polycarbonate, raw materials and auxiliary substances having a low degree of impurities are preferably used. In the case of preparation by the melt transesterification process in particular, the bisphenols and carbonic acid derivatives used should be as free as possible of alkali ions and alkaline earth ions. Such pure raw materials are obtainable, for example, by recrystallizing, washing or distilling the carbonic acid derivatives, for example carbonic acid esters, and the bisphenols.

The polycarbonates that are suitable according to the invention have a weight-average molecular weight ($\overline{M}_w$), which may be determined, for example, by ultracentrifugation or scattered light measurement, of preferably from 10,000 to 200,000 g/mol. Particularly preferably, they have a weight-average molecular weight of from 12,000 to 80,000 g/mol, especially preferably from 20,000 to 35,000 g/mol.

The molecular weights of the polycarbonates according to the invention may be adjusted, for example, in known manner by an appropriate amount of chain terminators. The chain terminators may be used individually or in the form of a mixture of different chain terminators.

Suitable chain terminators are both monophenols and monocarboxylic acids. Suitable monophenols are, for example, phenol, p-chlorophenol, p-tert.-butylphenol, cumylphenol or 2,4,6-tribromophenol, as well as long-chained alkylphenols, such as, for example, 4-(1,1,3,3-tetramethylbutyl)-phenol, or monoalkylphenols or dialkylphenols having a total of from 8 to 20 carbon atoms in the alkyl substituents, such as, for example, 3,5-di-tert.-butylphenol, p-tert.-octylphenol, p-dodecylphenol, 2-(3,5-dimethyl-heptyl)-phenol or 4-(3,5-dimethyl-heptyl)-phenol. Suitable monocarboxylic acids are benzoic acid, alkylbenzoic acids and halobenzoic acids.

Preferred chain terminators are phenol, p-tert.-butylphenol, 4-(1,1,3,3-tetramethyl-butyl)-phenol and cumylphenol.

The amount of chain terminators is preferably from 0.25 to 10 mol %, based on the sum of the bisphenols used in a particular case.

The polycarbonates that are suitable according to the invention may be branched in a known manner, preferably by the incorporation of branching agents having a functionality of three or more. Suitable branching agents are, for example, those having three or more phenolic groups or those having three or more carboxylic acid groups.

Suitable branching agents are, for example, phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tris-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-terephthalic acid ester, tetra-(4-hydroxyphenyl)-methane, tetra-(4-(4-hydroxyphenyl-isopropyl)-phenoxy)-methane and 1,4-bis-(4',4''-dihydroxytriphenyl)-methylbenzene, as well as 2,4-dihydroxybenzoic acid, trimesic acid, cyanuric chloride, 3,3-bis-(3-methyl-4-hydroxyphenyl)-2-oxo-2,3-dihydroindole, trimesic acid trichloride and α,α',α''-tris-(4-hydroxyphenol)-1,3,5-triisopropylbenzene.

Preferred branching agents are 1,1,1-tris-(4-hydroxyphenyl)-ethane and 3,3-bis-(3-methyl-4-hydroxyphenyl)-2-oxo-2,3-dihydroindole.

The amount of the branching agents that are optionally to be used is preferably from 0.05 mol % to 2 mol %, based on moles of bisphenols used.

In the case of the preparation of the polycarbonate by the interfacial process, for example, the branching agents may be placed in a reaction vessel with the bisphenols and the chain terminators in the aqueous alkaline phase, or they may be added in the form of a solution in an organic solvent together with the carbonic acid derivatives. In the case of the transesterification process, the branching agents are preferably added together with the dihydroxy aromatic compounds or bisphenols.

Catalysts that are preferably to be used in the preparation of polycarbonate by the melt transesterification process are the ammonium salts and phosphonium salts known in the literature (see, for example, U.S. Pat. No. 3,442,864, JP-A-14742/72, U.S. Pat. No. 5,399,659 and DE-A 19 539 290).

It is also possible to use copolycarbonates. Copolycarbonates within the scope of the invention are in particular polydiorganosiloxane-polycarbonate block copolymers whose weight-average molecular weight ($\overline{M}_W$) is preferably from 10,000 to 200,000 g/mol, particularly preferably from 20,000 to 80,000 g/mol (determined by gel chromatography after prior calibration by scattered light measurement or ultracentrifugation). The content of aromatic carbonate structural units in the polydiorganosiloxane-polycarbonate block copolymers is preferably from 75 to 97.5 wt. %, particularly preferably from 85 to 97 wt. %. The content of polydiorganosiloxane structural units in the polydiorganosiloxane-polycarbonate block copolymers is preferably from 25 to 2.5 wt. %, particularly preferably from 15 to 3 wt. %. The polydiorganosiloxane-polycarbonate block copolymers may be prepared, for example, starting from polydiorganosiloxanes containing α,ω-bishydroxyaryloxy end groups and having a mean degree of polymerization of preferably $P_n$=from 5 to 100, particularly preferably $P_n$=from 20 to 80.

Conventional additives, such as, for example, mold-release agents may be mixed with the polycarbonates in the melt or applied to the surface thereof. The polycarbonates used preferably already contain mold-release agents prior to compounding with the other components of the molding compositions according to the invention.

Component C

According to the invention, the compositions contain as component C) an impact modifier of glycidyl ester that is a random copolymer of formula (IV)

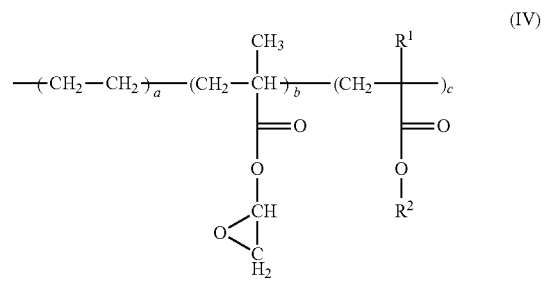

wherein $R^1$ is H or $C_1$- to $C_6$-alkyl, preferably H or methyl, $R^2$ is alkyl or aryl, preferably ($C_1$-$C_4$)alkyl or ($C_6$-$C_{20}$)aryl, particularly preferably methyl, ethyl, butyl, a+b+c=100, a has a value of from 50 to 99.5, preferably from 45 to 75, particularly preferably from 60 to 75, b has a value of from 0.5 to 25, preferably from 4 to 16, particularly preferably from 6 to 8, and c has a value of from 0 to 50, preferably from 20 to 40, particularly preferably from 20 to 25.

The term ($C_6$-$C_{20}$)aryl denotes a hydrocarbon group that includes one or more unsaturated 6-membered carbon rings and may optionally be substituted by one or more alkyl groups on one of the aromatic rings in order to form a substituent group having a total of from 6 to 20 carbon atoms per group, such as, for example, phenyl, naphthyl, tolyl, xylyl, mesityl, isopropylphenyl.

Component D

The composition may additionally contain polymer additives such as, for example, flameproofing agents (e.g. organophosphates, silicones or halogenated organic compounds), antidripping agents (for example compounds of the substance classes of the fluorinated polyolefins, of the silicones as well as aramid fibers), lubricants and mold-release agents (for example pentaerythritol tetrastearate), rubber-elastic polymers, nucleating agents, antistatics, stabilizers, fillers and reinforcing agents (for example glass or carbon fibers, mica, talc, wollastonite, kaolin, $CaCO_3$ and glass flakes) as well as coloring agents and pigments. These additives are used in the molding compositions according to the invention in concentrations of up to 20 wt. %, preferably from 0.01 to 10 wt. %, particularly preferably from 0.05 to 5 wt. %, especially preferably from 0.1 to 3 wt. %, based on the total weight of the molding compositions.

All part by weight data in this application are so normalized that the sum of the parts by weight of components A) to C) and optionally D) in the composition is equal to 100.

The compositions according to the invention may further comprise as component D) conventional additives, which may be added generally from 0 up to 15, preferably in an amount of from 0.01 to 10 wt. %, particularly preferably from 0.05 to 5 wt. %, especially preferably from 0.1 to 3 wt. %, based on the total weight of the molding compositions.

All conventional additives are suitable, such as, for example, stabilizers (for example UV stabilizers, heat stabilizers), antistatics, flow aids, mold-release agents, fireproofing additives, emulsifiers, nucleating agents, plasticizers, lubricants, additives that lower the pH value (e.g. compounds containing carboxyl groups), additives for increasing conductivity, coloring agent and pigments. The mentioned additives and further suitable additives are described, for example, in Gächter, Miller, Kunststoff-Additive, 3rd Edition, Hanser-Verlag, Munich, Vienna, 1989. The additives may be used on their own or in a mixture or in the form of masterbatches. The additives may be mixed in and/or applied to the surface.

As stabilizers there may be used, for example, sterically hindered phenols and/or phosphites, hydroquinones, aromatic secondary amines, such as diphenylamines, substituted resorcinols, salicylates, benzotriazoles and benzophenones, as well as variously substituted representatives of these groups, and mixtures thereof.

As nucleating agents there may be used, for example, sodium phenylphosphinate, aluminium oxide, silicon dioxide and, preferably, talc and the nucleating agents described hereinbefore.

As lubricants and mold-release agents there may be used ester waxes, pentaerythritol stearate (PETS), long-chained fatty acids (e.g. stearic acid or behenic acid), salts thereof (e.g. Ca or Zn stearate) as well as amide derivatives (e.g. ethylene-bis-stearylamide) or montan waxes (mixtures of straight-chained, saturated carboxylic acids having chain lengths of from 28 to 32 carbon atoms) and also low molecular weight polyethylene or polypropylene waxes.

As plasticizers there may be used, for example, phthalic acid dioctyl esters, phthalic acid dibenzyl esters, phthalic acid butylbenzyl esters, hydrocarbon oils, N-(n-butyl)benzenesulfonamide.

In order to obtain conductive molding compositions it is possible to add carbon blacks, conductive carbon blacks, carbon fibrils, nano-scale graphite fibers (nanotubes), graphite, conductive polymers, metal fibers as well as other conventional additives for increasing conductivity.

As flameproofing agents there may be used commercially available organic halogen compounds with synergists, or commercially available organic nitrogen compounds or organic/inorganic phosphorus compounds, individually or in a mixture. Mineral flameproofing additives, such as magnesium hydroxide or Ca—Mg carbonate hydrates (e.g. DE-A 4 236 122), may also be used. Examples of halogen-containing, especially brominated and chlorinated, compounds which may be mentioned include: ethylene-1,2-bistetrabromophthalimide, epoxidized tetrabromobisphenol A resin, tetrabromobisphenol A oligocarbonate, tetrachlorobisphenol A oligocarbonate, pentabromopolyacrylate, brominated polystyrene. Suitable organic phosphorus compounds are the phosphorus compounds according to WO-A 98/17720 (PCT/EP/05705), for example triphenyl phosphate (TPP), resorcinol bis-(diphenylphosphate), including oligomers, as well as bisphenol A bis-diphenylphosphate, including oligomers (see e.g. EP-A 363 608 and EP-A 640 655), melamine phosphate, melamine pyrophosphate, melamine polyphosphate and mixtures thereof. Suitable nitrogen compounds are in particular melamine and melamine cyanurate. There are suitable as synergists, for example, antimony compounds, in particular antimony trioxide and antimony pentoxide, zinc compounds, tin compounds, such as, for example, tin stannate, and borates. Carbon formers and tetrafluoroethylene polymers may be added. The flameproofing agents, optionally with a synergist, such as antimony compounds, and antidripping agents are generally used up to an amount of 30 wt. %, preferably 20 wt. % (based on the composition as a whole).

There may be present as additives also fillers such as, for example, talc, mica, silicate, quartz, titanium dioxide, wollastonite, kaolin, amorphous silicas, magnesium carbonate, chalk, feldspar, barium sulfate, glass spheres and/or fibrous fillers and/or reinforcing materials based on carbon fibers and/or glass fibers. Preference is given to the use of particulate mineral fillers based on talc, mica, silicate, quartz, titanium dioxide, wollastonite, kaolin, amorphous silicas, magnesium carbonate, chalk, feldspar, barium sulfate and/or glass fibers. Particular preference is given according to the invention to particulate mineral fillers based on talc, wollastonite and/or glass fibers. Fillers based on talc are most preferred. The filler and/or reinforcing material may optionally be surface-modified, for example with an adhesion promoter or adhesion promoter system, e.g. based on silane. Pretreatment is not absolutely necessary, however. In particular when glass fibers are used, it is possible to employ, in addition to silanes, also polymer dispersions, film formers, branching agents and/or glass fiber processing aids.

The compositions obtained by the process according to the invention may be processed according to conventional processes to produce article of manufacture including semi-finished products and moldings of all kinds. Examples of processing processes which may be mentioned include extrusion processes and injection-molding processes. Examples of semi-finished products which may be mentioned are films and sheets.

Moldings or semi-finished products produced from the molding compositions/preparations used according to the invention may also be combined with further materials, such as, for example, metal or plastics. The molding compositions according to the invention, or the moldings/semi-finished products produced from the molding compositions used according to the invention, may, by means of conventional techniques for connecting and joining a plurality of components or parts, such as, for example, coextrusion, injection-molding on the back of films, injection-molding around inserts, adhesive bonding, welding, screwing or clamping, be used in conjunction with other materials, or may themselves be used, for the manufacture of finished articles, such as, for example, interior fittings for motor vehicles (for example mirror casings, ventilation grills) or exterior bodywork parts.

Evaluation of the gloss of the moldings or semi-finished products produced according to the invention was carried out in accordance with DIN 67 530 using a reflectometer at an angle of incidence of 20°. High-gloss within the scope of the invention means a gloss value of greater than or equal to 90%. The invention therefore relates also to the use of the process according to the invention in the production of high-gloss moldings or semi-finished products.

EXAMPLES

Component A-1
Linear polybutylene terephthalate powder having a mean particle size ($d_{50}$) of 648 μm and having a melt viscosity according to DIN 54 811 of 199 Pa·s at 240° C. and at a shear rate of 500 $s^{-1}$ (Pocano B 1300, Lanxess AG, Leverkusen, Germany).

Component A-2
Polybutylene terephthalate granules having a melt viscosity according to DIN 54 811 of 227 Pa·s at 240° C. and at a shear rate of 500 $s^{-1}$ (Ultradur® B 2550, BASF AG, Ludwigshafen, Germany).

Component A-3
Linear polybutylene terephthalate granules having a melt viscosity according to DIN 54 811 of 199 Pa·s at 240° C. and at a shear rate of 500 $s^{-1}$ (Pocan® B 1300, Lanxess AG, Leverkusen, Germany).

Component B-1
Cryo-ground polycarbonate powder having a mean particle size ($d_{50}$) of 632 μm and having a relative solution viscosity of 1.318, measured in dichloromethane as solvent at 25° C. and in a concentration of 0.5 g/100 ml (Makrolon® 3108, Bayer MaterialScience AG, Leverkusen, Germany).

Component B-2
Polycarbonate granules having a relative solution viscosity of 1.280, measured in dichloromethane as solvent at 25° C. and in a concentration of 0.5 g/100 ml (Makrolon® 2608, Bayer MaterialScience AG, Leverkusen, Germany).

Components C-1 to C-5
Glycidyl ester copolymer as impact modifier according to formula (IV), wherein a, b, c, $R^1$ and $R^2$ are as defined according to Table 1 below.

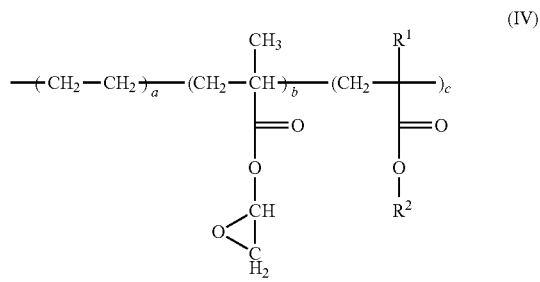

Component D-1
Carbon black (Black Pearls® 800, Cabot Corporation, Boston, USA).

Component D-2
Phosphite stabiliser (Irgafos® 168, Ciba Specialities, Basel, Switzerland).

Components D-1 and D-2 are believed to have no criticality in the context of the inventive process.

The molding compositions were tested according to the following methods:

Izod notched impact strength: Strength according to ISO 180 method 1 U, measured at room temperature.

The gloss of the flat plastics surfaces was evaluated according to DIN 67 530 using a reflectometer at an angle of incidence of 20°. The corresponding measured values are given in the tables as "20° gloss".

Preparation and Testing of the Molding Compositions According to the Invention

Step 1: Preparation of the Filled CoPE

Mixing of the components corresponding to the compositions according to Table 2 is carried out on a twin-shaft extruder (ZSK25 from Werner und Pfleiderer) at a temperature of the composition of from 130 to 150° C. Production was carried out at a throughput of 10 kg/h, without breakage of the extrudate.

TABLE 2

Preparation of the mixture in the first step of the inventive process (herein CoPE)

| Components (parts by weight) | CoPE | | | | | | | |
|---|---|---|---|---|---|---|---|---|
| | a | b | c | d | e | f | g | h |
| A-1 (powdered polybutylene terephthalate) | 50 | 50 | 50 | 50 | 50 | 50 | 60 | |
| B-1 (powdered polycarbonate) | | | | | | | | 60 |
| C-1 (Glycidyl ester copolymer) | 50 | 37.5 | 25 | 25 | 25 | 25 | 40 | 40 |
| C-2 (Glycidyl ester copolymer) | | 12.5 | 25 | | | | | |
| C-3 (Glycidyl ester copolymer) | | | | 25 | | | | |
| C-4 (Glycidyl ester copolymer) | | | | | 25 | | | |
| C-5 (Glycidyl ester copolymer) | | | | | | 25 | | |

Step 2: Preparation of the Molding Compositions According to the Invention

Mixing of the components is carried out on a twin-shaft extruder (ZSK25 from Werner und Pfleiderer) at a temperature of the composition of from 250° C. to 255° C. and a throughput of 15 kg/h. The resulting mixture is granulated and dried.

The molded articles are produced (unless described otherwise) on an Arburg 270 E type injection-molding machine at from 260 to 280° C. and tool temperatures of from 70 to 90° C.

TABLE 1

Components C-1 to C-5

| Component | Glycidyl ester polymer | Manufacturer | a | b | c | $R^1$ | $R^2$ | MVR*) [$cm^3$/10 min] |
|---|---|---|---|---|---|---|---|---|
| C-1 | Lotader® AX8900 | Arkéma | 67 | 8 | 25 | H | $CH_3$ | 6 |
| C-2 | Lotryl® 29MA03 | Arkéma | 71 | 0 | 29 | $CH_3$ | $CH_3$ | 2.8 |
| C-3 | Lotryl® 30BA02 | Arkéma | 71 | 0 | 29 | $CH_3$ | $C_4H_9$ | 2.0 |
| C-4 | Elvaloy® 2715 | Dupont | 85 | 0 | 15 | $CH_3$ | $C_2H_5$ | 7.0 |
| C-5 | Elvaloy® 3427 | Dupont | 73 | 0 | 27 | $CH_3$ | $C_2H_5$ | 4.0 |

*)Melt volume index at 190° C. according to ISO 1133 with a load of 2.16 kg.

The composition and properties of the thermoplastic molding compositions according to the invention are indicated in Table 3. From the calculation of the total composition of the molding compositions of Table 3 it follows that the total molding compositions each contain 20 wt. % A components (A-1 and A-2), 76.4 wt. % B components (B-1 and B-2) and 3.0 wt. % C components (C-1 to C-5).

TABLE 3

Compositions and their properties

|  | 1 | 2 | 3 | 4 | 5 | 6 | 7 | 8 |
|---|---|---|---|---|---|---|---|---|
| Components |  |  |  |  |  |  |  |  |
| CoPE | a | b | c | d | e | f | g | h |
| CoPE (parts by wt.) | 6.0 | 6.0 | 6.0 | 6.0 | 6.0 | 6.0 | 7.5 | 7.5 |
| A-2 (parts by wt.) | 17.0 | 17.0 | 17.0 | 17.0 | 17.0 | 17.0 | 15.5 | 20.0 |
| B-1 (parts by wt.) | 5.0 | 5.0 | 5.0 | 5.0 | 5.0 | 5.0 | 5.0 | 5.0 |
| B-2 (parts by wt.) | 71.4 | 71.4 | 71.4 | 71.4 | 71.4 | 71.4 | 71.4 | 66.9 |
| D-1 (parts by wt.) | 0.4 | 0.4 | 0.4 | 0.4 | 0.4 | 0.4 | 0.4 | 0.4 |
| D-2 (parts by wt.) | 0.2 | 0.2 | 0.2 | 0.2 | 0.2 | 0.2 | 0.2 | 0.2 |
| Resulting Composition (calculated) |  |  |  |  |  |  |  |  |
| A-1 (wt.-%) | 3 | 3 | 3 | 3 | 3 | 3 | 4.5 | — |
| A-2 (wt.-%) | 17 | 17 | 17 | 17 | 17 | 17 | 15.5 | 20 |
| B-1 (wt.-%) | 5 | 5 | 5 | 5 | 5 | 5 | 5 | 9.5 |
| B-2 (wt.-%) | 71.4 | 71.4 | 71.4 | 71.4 | 71.4 | 71.4 | 71.4 | 66.9 |
| C-1 (wt.-%) | 3 | 2.25 | 1.5 | 1.5 | 1.5 | 1.5 | 3 | 3 |
| C-2 (wt.-%) | — | 0.75 | 1.5 | — | — | — | — | — |
| C-3 (wt.-%) | — | — | — | 1.5 | — | — | — | — |
| C-4 (wt.-%) | — | — | — | — | 1.5 | — | — | — |
| C-5 (wt.-%) | — | — | — | — | — | 1.5 | — | — |
| D-1 (wt.-%) | 0.4 | 0.4 | 0.4 | 0.4 | 0.4 | 0.4 | 0.4 | 0.4 |
| D-2 (wt.-%) | 0.2 | 0.2 | 0.2 | 0.2 | 0.2 | 0.2 | 0.2 | 0.2 |
| Properties |  |  |  |  |  |  |  |  |
| Izod notched impact strength (kJ/m$^2$) | 63.6 | 62.2 | 60.0 | 58.5 | 55.1 | 58.4 | 64.7 | 59.5 |
| 20° gloss (%) | 92.7 | 97.4 | 99.2 | 94.3 | 95.9 | 99.1 | 92.5 | 94.6 |

Comparison Examples

Preparation and Testing of Molding Compositions not According to the Invention

Step 1: Preparation of CoPE

For the preparation of a pre-compound from PBT in granular form and the glycidyl ester copolymer corresponding to the compositions according to Table 4, mixing of the components is carried out on a twin-shaft extruder (ZSK25 from Werner und Pfleiderer) at a temperature of the composition of from 216° C. to 220° C. Production was carried out at a throughput of 15 kg/h, without breakage of the extrudate.

TABLE 4 pre-compound compositions (comparison examples)

| Components (parts by weight) | CoPE i (comparison) | CoPE j (comparison) |
|---|---|---|
| A-2 (PBT granules) | 69.5 | 84.5 |
| C-1 | 30.0 | 15.0 |
| D-1 | 0.2 | 0.2 |
| D-2 | 0.3 | 0.3 |

Step 2: Preparation of the Molding Compositions not According to the Invention (Comparison Examples)

Mixing of the components is carried out on a twin-shaft extruder (ZSK25 from Werner und Pfleiderer) at a temperature of the composition of from 250° C. to 257° C. and a throughput of 15 kg/h. The resulting mixture is granulated and dried.

The molded bodies are produced (unless described otherwise) on an Arburg 270 E type injection molding-machine at from 260 to 280° C. and tool temperatures of from 70 to 90° C.

The composition and properties of the thermoplastic molding compositions that are not according to the invention are indicated in Table 5. From the calculation of the total composition of the molding compositions of Table 5 it follows that these molding compositions each contain approx. 17 wt. % A components, 79.5 wt. % B components, 3.0 wt. % C components and 0.55 wt. % and 0.6 wt.-%, respectively, D components.

TABLE 5

Compositions and their properties (comparison examples)

|  | 9 (comparison) | 10 (comparison) |
|---|---|---|
| Components |  |  |
| CoPE | i | j |
| CoPE (parts by wt.) | 10 | 20 |
| A-3 (parts by wt.) | 10 | — |
| B-1 (parts by wt.) | 5.0 | 5.0 |
| B-2 (parts by wt.) | 74.5 | 74.5 |
| D-1 (parts by wt.) | 0.2 | 0.2 |
| D-2 (parts by wt.) | 0.3 | 0.3 |
| A1-A3 (total, %) | 17.0 | 17.0 |
| B1-B2 (total, %) | 79.5 | 79.5 |
| C1-C5 (total, %) | 3.0 | 3.0 |
| D1 (total, %) | 0.2 | 0.2 |
| D2 (total, %) | 0.3 | 0.3 |
| Resulting composition (calculated) |  |  |
| A-2 (wt.-%) | 6.95 | 16.90 |
| A-3 (wt.-%) | 10 | — |
| B-1 (wt.-%) | 5 | 5 |
| B-2 (wt.-%) | 74.5 | 74.5 |
| C-1 (wt.-%) | 3 | 3 |
| D-1 (wt.-%) | 0.22 | 0.24 |
| D-2 (wt.-%) | 0.33 | 0.36 |
| Properties |  |  |
| Izod notched impact strength (kJ/m$^2$) | 67.2 | 66.1 |
| 20° gloss (%) | 90.0 | 87.1 |

The process for the production of Comparison Examples 9 and 10 leads to moldings which have lower gloss (see Table 5) than the process according to the invention for the production of Examples 1 to 8 (see Table 3).

By means of the process according to the invention it is possible to incorporate the glycidyl ester copolymer (component C) very efficiently into the polyalkylene terephthalate or polycarbonate in amounts even over 30 wt. %. As is demonstrated in Table 2 by the filled glycidyl ester copolymers CoPE-a to CoPe-h according to the invention, it is possible using the process according to the invention to prepare and process even mixtures having a content of 40 or 50 wt. % glycidyl ester copolymer without negative effects on the gloss of the resulting moldings (see Table 3).

If, on the other hand, mixing of the glycidyl ester copolymer (component C) with polyalkylene terephthalate takes place in the first step in the melt according to conventional compounding methods, a concentration of over 30 wt. % in the overall composition of the molding cannot be achieved, because as the content of glycidyl ester copolymer increases, the extruded melt becomes unstable to segregation (phase separation) before the solid state of aggregation is reached. A further disadvantage of mixing in the melt (process according to the comparison examples) is that, in the melt, the end groups of the polyalkylene terephthalate are able to react with epoxy groups of the glycidyl ester copolymer, resulting in the formation of large, not readily dispersible particles which, after further processing, reduce the gloss of the resulting molding.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for producing an impact-modified polyester/polycarbonate composition, comprising:
   (i) combining, at a temperature of from 90 to 175° C., a melt of glycidyl ester with a powder form of at least one member selected from a first group consisting of polyalkylene terephthalate and polycarbonate, thereby obtaining a mixture; and
   in a subsequent step, combining the mixture with at least one component selected from a second group consisting of polyalkylene terephthalate and polycarbonate, thereby obtaining the impact-modified polyester/polycarbonate composition.

2. The process of claim 1 wherein the temperature of step (i) is from 100 to 150° C.

3. The process of claim 1 wherein the composition obtained includes
   A) 4 to 95 parts by weight of polyalkylene terephthalate,
   B) 4 to 95 parts by weight of aromatic polycarbonate,
   C) 1 to 30 parts by weight of glycidyl ester, and
   D) 0 to 20 parts by weight of conventional additives and processing aids.

4. The process of claim 1 wherein said at least one member of said first group is polyalkylene terephthalate having mean particle size ($d_{50}$) of 600 to 700 μm.

5. The process of claim 4 wherein said subsequent step is carried out in the melt at 220 to 300° C.

6. The process of claim 3 wherein said member of said first group is polyalkylene terephthalate having a mean particle size ($d_{50}$) of 600 to 700 μm and wherein said subsequent step is carried out at 220 to 300° C.

7. The process of claim 1 wherein said glycidyl ester conforms to formula (IV)

$$-(CH_2-CH_2)_a-(CH_2-\underset{\underset{\underset{CH_2}{\overset{|}{O}}}{\overset{|}{CH}}}{\overset{CH_3}{\underset{|}{C}}}H)_b-(CH_2-\underset{\underset{R^2}{\overset{|}{O}}}{\overset{R^1}{\underset{|}{C}}})_c- \quad (IV)$$

wherein
   $R^1$ is H or $C_1$- to $C_6$-alkyl,
   $R^2$ is alkyl or aryl,
   a+b+c=100,
   a is 50 to 99.5,
   b is 0.5 to 25 and
   c is 0 to 50.

8. The process of claim 7, wherein:
   a is from 60 to 75;
   b is from 6 to 8; and
   c is from 20 to 25.

9. The process of claim 3, wherein the sum of the parts by weight of components A, B, C, and D is 100.

10. The process of claim 3, wherein component D) is 0.15 to 15 parts by weight.

11. The process of claim 1 wherein the composition obtained contains:
   A) 15 to 30 parts by weight of polybutylene terephthalate,
   B) 35 to 55 parts by weight of aromatic polycarbonate,
   C) 8 to 16 parts by weight of glycidyl ester, and
   D) 0.2 to 10 parts by weight of conventional additives and processing aids.

12. The process of claim 1 wherein said member of said first group is polyalkylene terephthalate having mean particle size ($d_{50}$) of 630 to 640 μm.

* * * * *